E. F. SCHERMERHORN.
INSULATED RAIL JOINT.
APPLICATION FILED APR. 26, 1913.
1,084,903.
Patented Jan. 20, 1914.
3 SHEETS—SHEET 1.
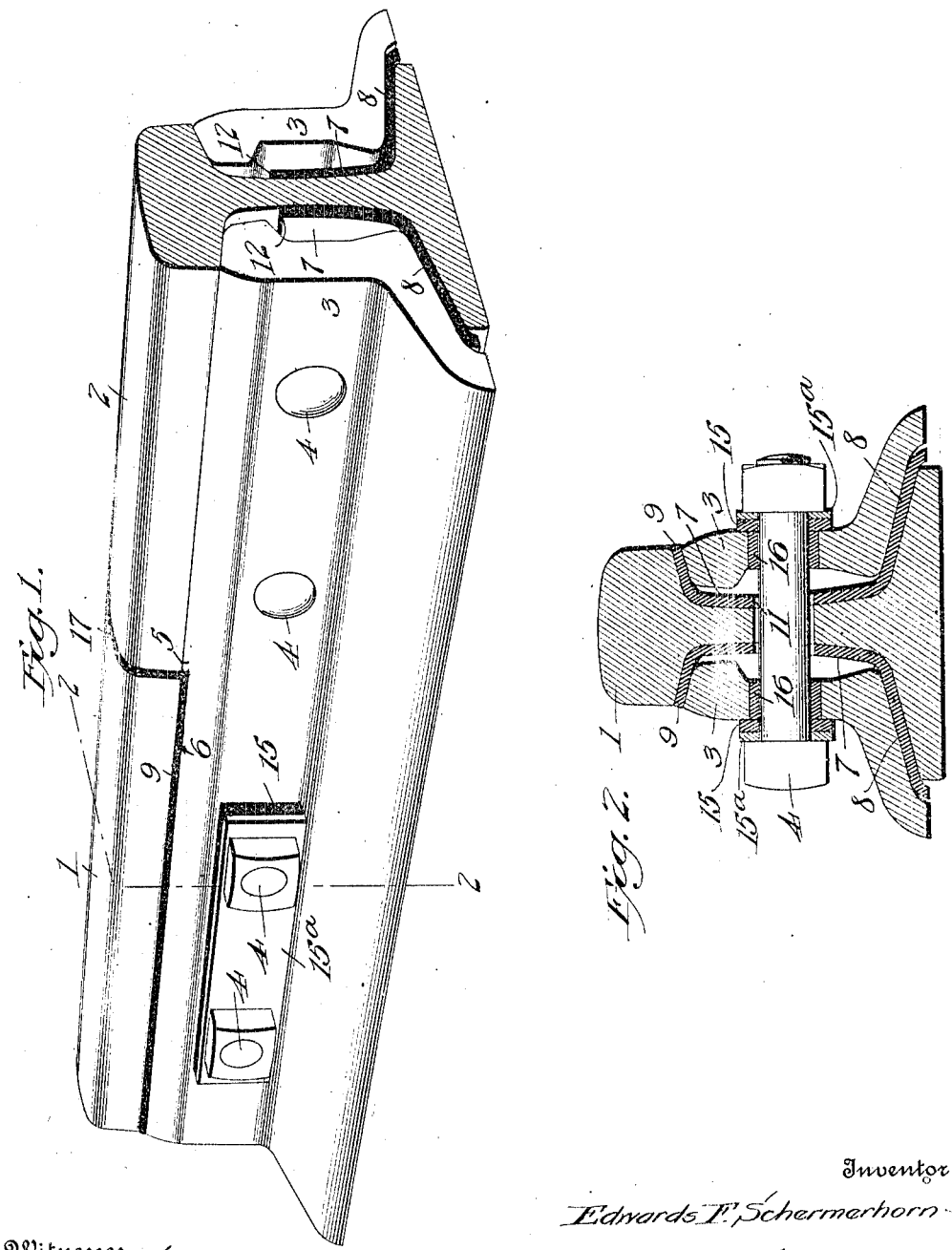
Witnesses
T. L. Michalec
Harry B. Rook
Inventor
Edwards F. Schermerhorn
By
his Attorney

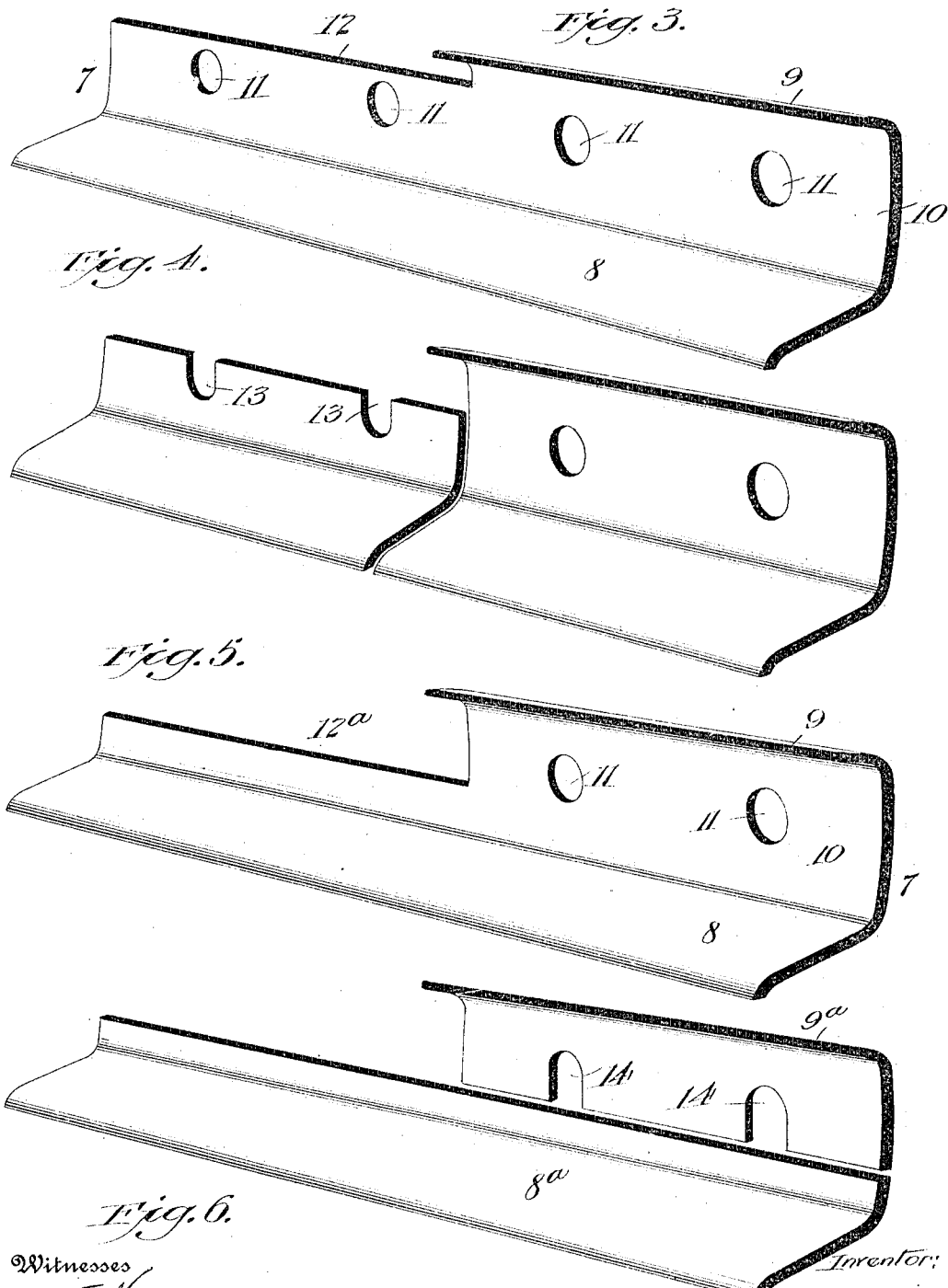

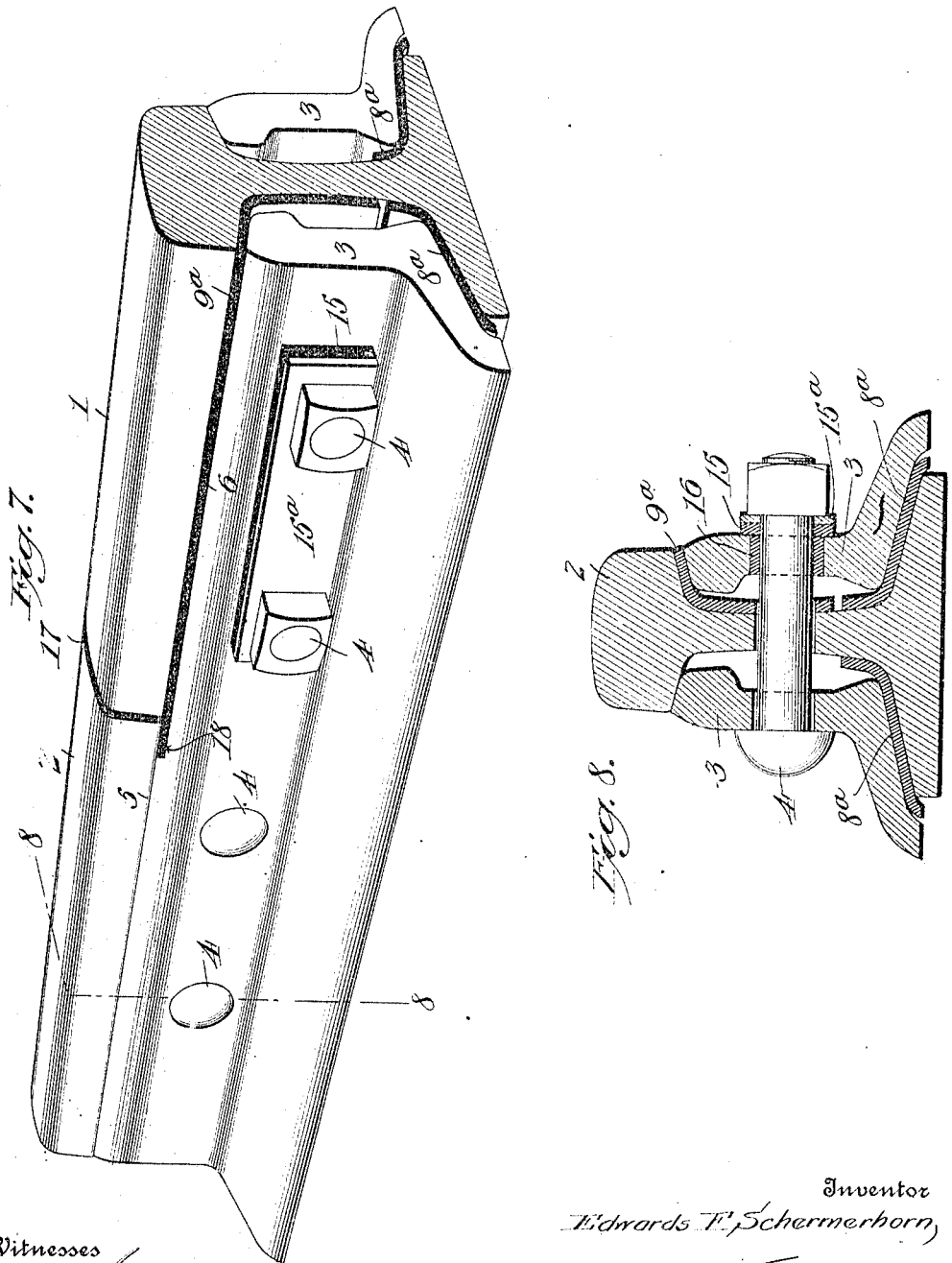

UNITED STATES PATENT OFFICE.

EDWARDS F. SCHERMERHORN, OF BROOKLYN, NEW YORK, ASSIGNOR TO THE RAIL JOINT COMPANY, OF NEW YORK, N. Y., A CORPORATION OF NEW YORK.

INSULATED RAIL-JOINT.

1,084,903.  Specification of Letters Patent.  Patented Jan. 20, 1914.

Application filed April 26, 1913. Serial No. 763,792.

*To all whom it may concern:*

Be it known that I, EDWARDS F. SCHERMERHORN, citizen of the United States, residing at Brooklyn, in the county of Kings and State of New York, have invented certain new and useful Improvements in Insulated Rail-Joints, of which the following is a specification.

This invention relates to an improvement in insulated rail joints, the object of which is to provide a joint of this character which shall have a maximum strength and durability with a minimum number of parts, rendering the same easy of manufacture and easy of application in track.

A special object of the invention is to provide a means for thoroughly insulating a rail joint in such a manner as to permit of metallic connection between each joint bar and the head of one rail, preferably the receiving rail, thus avoiding the use of the insulation at the place most subject to wear and consequently materially increasing the life of the joint as an insulator.

Also the improvement provides for allowing the base section of insulation to extend the full length of the joint since such insulation is not subjected to the same destructive wear as that under the heads of the rails, and in this connection the use of the continuous base insulation avoids the considerable rigidity and stiffness of an all-metal construction for one end of the joint and provides uniformity of flexibility throughout.

With these and such other objects in view as will readily appear to those familiar with the art, the invention consists in the novel combination of parts herein fully described, illustrated, and claimed, and certain preferable embodiments of the invention are illustrated in the accompanying drawings, in which—

Figure 1 is a sectional perspective view illustrating the claimed improvements embodied in a form in which the head insulation is confined to one rail. Fig. 2 is a cross sectional view of the joint shown in Fig. 1 on the line 2—2 of the same. Figs. 3 to 6 inclusive are similar detail views showing various modified forms of the insulation that may be employed. Fig. 7 is a sectional perspective view showing the improvements applied to a rail joint in which the head insulation is staggered. Fig. 8 is a cross sectional view on the line 8—8 of Fig. 7.

Like reference characters designate corresponding parts in the several figures of the drawings.

The features of improvement constituting the present invention are not limited in their application to any particular type of rail joints, and hence are available for use with fish plates, angle bars, channel bars, or any of the divers forms of splices which extend across the joint between the meeting ends of the rails, but for purposes of illustration, there is shown in the drawings an angle bar type of rail joint constructed in accordance with the invention.

Referring first to the embodiment suggested in Figs. 1 and 2 of the drawings, the rail joint shown therein includes the separate rails 1 and 2 which are respectively the leaving rail and the receiving rail, a pair of oppositely arranged angle joint bars 3, and the usual joint bolts 4. Each joint bar 3 is rolled or otherwise formed at one side of the transverse center thereof with a bearing offset 5 on the head thereof which has a direct metal-to-metal bearing contact with the under side of the head of one rail end, the corresponding depression or recess 6 in the other half of the head portion of said bar being adapted to receive a head section of insulation as will presently appear. Therefore, the structural characteristic of each joint bar is a head bearing offset for direct engagement with the head of one rail end, and which offset is of a projection or height approximately equaling the thickness of the insert which is used under the head of the other rail end.

As already indicated, the invention preferably provides for the direct bearing contact between the head of each joint bar and the under side of the head of the receiving rail of the joint, thus confining the head section of insulation to a position between the joint bar and the under side of the head of the leaving rail, while at the same time involving the use of a base section of insulation for the base flanges of both of the rails. This manner of insulating the joint to secure the results specified may be accomplished in different ways, and by different forms of insulation, as suggested by the series of Figs. 3 to 6 inclusive of the drawings. For instance, as shown in Figs. 1, 2, and 3 of the drawings, the insulation for each side of the joint may consist of a one-piece sheet of insulating material designated in its entirety by the reference number 7, and including a full length base section of insulation 8, and approximately a half length head section of insulation 9, the two sections being integral parts of the same sheet and connected by a web section of insulation 10 that is coextensive in length with the base section 8 and is provided with the same number of bolt holes 11 as there are joint bolts 4, so as to receive the latter and be retained thereby against longitudinal or vertical displacement. In this form of insulation, the web section 10 is cut away near its top edge as at 12 for approximately one-half of its length so as to leave the projecting head section 9 along one end portion only of the sheet, said head section 9 of insulation being adapted to be interposed between the under side of the head of the leaving rail and the head portion of the joint bar, that portion of the head of the joint bar which directly engages or metallically connects with the rail head of the receiving rail lying above the cut away edge 12 of the insulation sheet, and hence being uninsulated. The full length base section of insulation 8 extends the full length of the joint and lies between the flanges of both rails and the under side of the flange of the angle bar.

The modified form of insulation shown in Fig. 4 is substantially the same in construction as that illustrated in Fig. 3 excepting that that part of the web portion 10 which is not provided with a head section of insulation may have formed therein, at its upper edge, open keeper notches 13 that detachably interlock with the bolts through the receiving rail. This modification also shows the insulation divided vertically into two pieces at or near its center.

As suggested in Fig. 5 the insulation may be in one sheet, and the headless end 12ª thereof may be cut away on a line entirely below the bolts, without affecting the insulating properties of the joint or impairing its stability. Again, as suggested in Fig. 6, the head section 9ª, and the base section 8ª, of the insulation, may be in separate pieces, said head section having keeper notches 14 to engage the bolts, or equivalent means, and adapted to be inserted between the head of the leaving rail and the joint bar, and the base section 8ª being clamped under the flange of the angle bar and extending over the rail bases.

Any suitable bolt insulation may be employed, but, preferably, in the joint shown in Figs. 1 and 2, this may be accomplished by means of insulating straps 15 and metal straps 15ª interposed between the outer sides of the joint bars and the heads and nuts of the bolts for the leaving rail, in connection with insulating ferrules or sleeves 16 placed within the bolt holes of the joint bars, as may be plainly seen from Figs. 1 and 2 of the drawings.

In adapting the invention to a staggered or cross head insulation as shown in Figs. 7 and 8 of the drawings, no structural changes are required at all in either the joint bar, the insulation, or any parts of the joint. It is simply necessary to arrange the joint bars and the insulation in reverse relation so that the head of one joint bar is insulated from the head of one rail, and the head of the other joint bar is insulated from the head of the other rail, the other ends of both joint bars being in direct contact with the under sides of rail heads. In this application of the invention, the base insulation is the same, viz., over the base flanges of both rails. Also, the bolt insulation may be the same except that in the said staggered or cross head insulated joint, it is only necessary to insulate the bolts from that end of the joint bar which is insulated completely from its adjacent rail, and consequently in the illustration given, the bolt insulation is shown only on the nut end of each bolt. Furthermore, the illustration in Figs. 7 and 8 of the drawings shows an application of the longitudinally divided fiber of Fig. 6 of the drawings. These figures of the drawings also show that feature of the invention which involves a head section of insulation which may be of greater length than one-half the length of the joint, so as to cross the center of the joint at the meeting ends of the rails, as indicated by the reference number 18 in Fig. 7 of the drawings. This projection of the head section of insulation, past the vertical transverse center of the joint, provides a construction wherein a portion of the head of the joint bar has a direct contact with the head of one rail, while the balance of the head of the bar has an insulated bearing beneath the heads of both rails, combined with base insulation for the flanges of both rails. This form of the invention provides for a very effective insulation of the joint, inasmuch as the inner end extension 18 of the head insulation materially assists in preventing short circuiting or current leakage at the meeting ends of the rails, due to wear of the insulating end post or other causes.

I claim:

1. An insulated rail joint comprising, in combination with the rails, a pair of joint bars each of which has a direct electrical contact with the head of one rail, and insulation for each side of the joint, which insulation includes a head section between the other rail and the joint bar at the same side, and a base section extending throughout the joint at both sides.

2. An insulated rail joint including in combination with the rails, a pair of joint bars, each of which has an electrical connection with the head of one rail, and a sheet of insulation for each side of the joint having a base section extending throughout the joint and a head section formed with one end portion of the base section.

3. An insulated rail joint including in combination with the rails, a pair of joint bars each of which has an electrical connection with the head of one rail, and a sheet of insulation consisting of a single piece of insulating material having a continuous base section coextensive with the length of the joint and a single head section projecting from one end portion of the base section.

4. An insulated rail joint including, in combination with the rails, a joint bar, a portion of the head of said bar having a direct electrical contact with the head of one rail and the balance of said head having an insulated bearing beneath the heads of both rails and a base insulation for the rail flanges.

5. An insulated rail joint including the rails, a joint bar, a portion of the head of said bar having an electrical contact with one rail, the balance of said head being electrically insulated from both rails, and electrical insulation for the rail flanges.

In testimony whereof I hereunto affix my signature in the presence of two witnesses.

EDWARDS F. SCHERMERHORN.

Witnesses:
BENJ. WOLHAUPTER,
KATHERINE McNALLY.

---

Copies of this patent may be obtained for five cents each, by addressing the "Commissioner of Patents, Washington, D. C."